United States Patent
Schibsbye

(10) Patent No.: US 9,505,180 B2
(45) Date of Patent: Nov. 29, 2016

(54) METHOD AND APPARATUS FOR DETECTING LEAK IN A VARTM PROCESS

(71) Applicant: LM Glasfiber A/S, Lunderskov (DK)

(72) Inventor: Karsten Schibsbye, Fredericia (DK)

(73) Assignee: LM GLASFIBER A/S, Lunderskov (DK)

( * ) Notice: Subject to any disclaimer, the term of this patent is extended or adjusted under 35 U.S.C. 154(b) by 0 days.

(21) Appl. No.: 14/200,300

(22) Filed: Mar. 7, 2014

(65) Prior Publication Data

US 2014/0183772 A1 Jul. 3, 2014

Related U.S. Application Data

(62) Division of application No. 12/918,065, filed as application No. PCT/EP2009/051923 on Feb. 18, 2009, now Pat. No. 8,708,014.

(30) Foreign Application Priority Data

Feb. 22, 2008 (EP) ..................................... 08388008

(51) Int. Cl.
*B29C 70/44* (2006.01)
*G01M 3/32* (2006.01)

(52) U.S. Cl.
CPC ............. *B29C 70/44* (2013.01); *B29C 70/443* (2013.01); *G01M 3/32* (2013.01)

(58) Field of Classification Search
CPC ..... B29C 70/44; B29C 70/443; B32B 37/10; B32B 37/1018
See application file for complete search history.

(56) References Cited

U.S. PATENT DOCUMENTS

| | | | |
|---|---|---|---|
| 3,818,752 A | 6/1974 | Lindeberg | |
| 4,409,817 A | 10/1983 | Edwards, Jr. | |
| 5,157,828 A * | 10/1992 | Coques et al. | 29/830 |
| 6,168,408 B1 | 1/2001 | Boime et al. | |
| 6,890,465 B2 * | 5/2005 | Dahl et al. | 264/140 |
| 2005/0073076 A1 | 4/2005 | Woods et al. | |
| 2007/0057413 A1 | 3/2007 | Haney | |
| 2007/0145622 A1 * | 6/2007 | Cicci et al. | 264/40.1 |

* cited by examiner

*Primary Examiner* — Christopher Schatz
(74) *Attorney, Agent, or Firm* — Nath, Goldberg & Meyer; Jerald L. Meyer; Tanya E. Harkins

(57) ABSTRACT

Producing a composite structure comprising fibre reinforced material impregnated with liquid resin by means of vacuum assisted resin transfer moulding, by method of: providing a forming structure comprising a rigid mould part and a second mould part; placing the fibre material in the rigid mould part; sealing the second mould part against the rigid mould part, forming a mould cavity; connecting a source of uncured fluid resin to at least one resin inlet communicating with the mould cavity; connecting at least one vacuum outlet communicating with the mould cavity; evacuating the interior of the forming structure through at least one vacuum outlet, measuring at least one vacuum outlet airflow level; supplying uncured resin from the source of uncured resin to the mould cavity through at least one resin inlet so as to fill the mould cavity with resin; and curing the resin in order to form the composite structure.

6 Claims, 3 Drawing Sheets

METHOD AND APPARATUS FOR DETECTING LEAK IN A VARTM PROCESS

Figure 1:
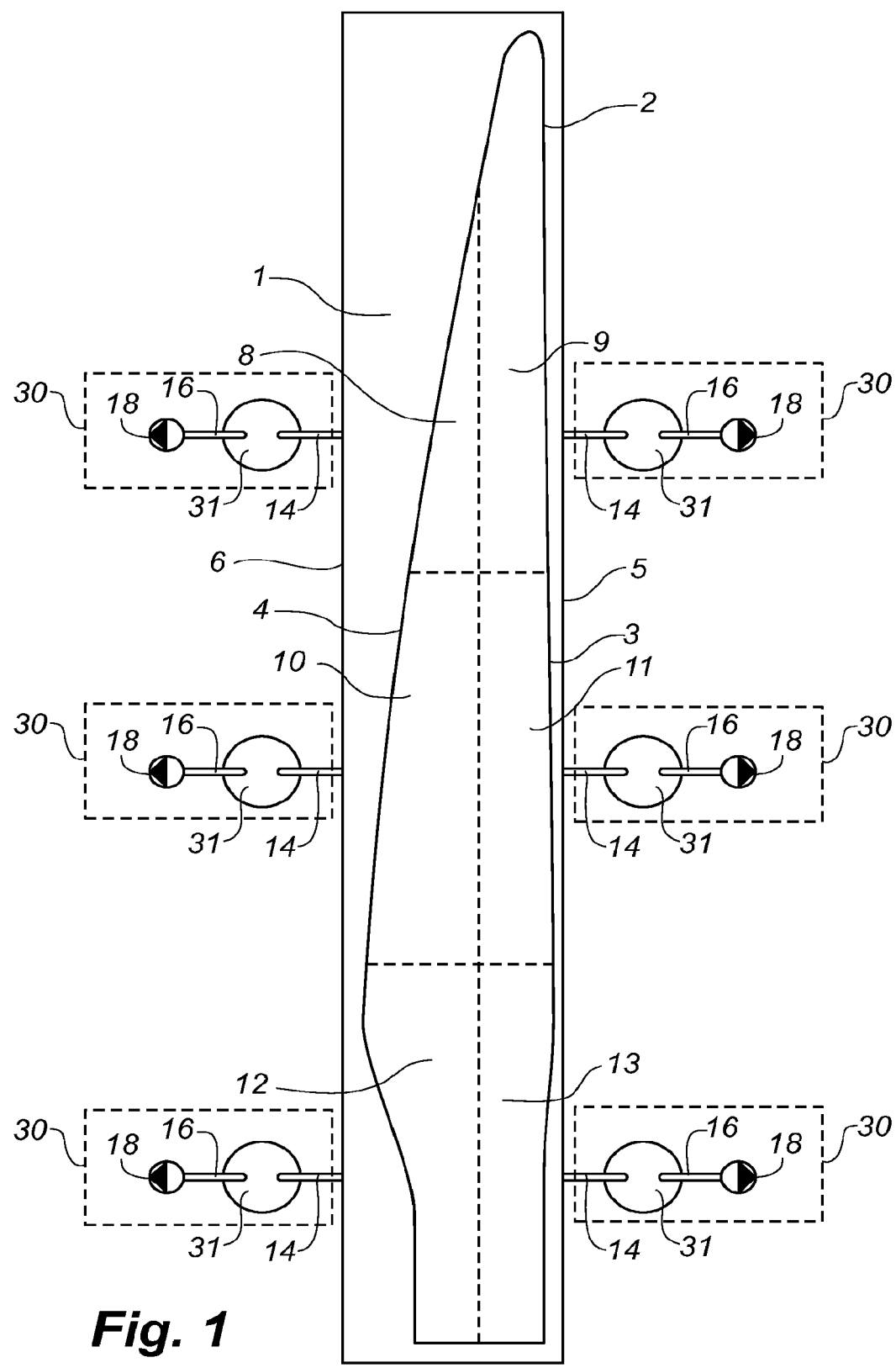

This is a Divisional Application of U.S. patent application Ser. No. 12/918,065, filed Aug. 18, 2010, which was filed under 35 U.S.C. 371 as a national stage of PCT/EP2009/051923, filed Feb. 18, 2009, which claims the benefit of European Application No. 08388008.8, filed Feb. 22, 2009, the entire content of each of which is hereby incorporated by reference in its entirety.

The present invention relates to a method for manufacturing a composite structure comprising fibre reinforced material by means of vacuum assisted resin transfer moulding, where fibre material is impregnated with liquid resin, wherein the method comprises the steps of: a) providing a forming structure comprising a rigid mould part and a second mould part, b) placing the fibre material in the rigid mould part, c) sealing the second mould part against the rigid mould part to form a mould cavity, d) connecting a source of uncured fluid resin to at least one resin inlet communicating with the mould cavity, e) connecting at least one vacuum outlet communicating with the mould cavity, f) evacuating the interior of the forming structure through the at least one vacuum outlet, g) supplying uncured resin from the source of uncured resin to the mould cavity through the at least one resin inlet so as to fill the mould cavity with resin, and h) curing the resin in order to form the composite structure.

The invention further relates to an apparatus for detecting an air leak during a vacuum assisted resin transfer moulding process, the apparatus comprising a sealed container with an interior, a first inlet, and a first outlet, wherein the first inlet and the first outlet are arranged so as to be able to communicate with the interior of the sealed container, and wherein the first outlet is connected to a vacuum source.

Thus the invention relates to a method and an apparatus for producing fibre composite structures by means of VARTM (vacuum assisted resin transfer moulding), where liquid polymer, also called resin, is filled into a mould cavity, in which fibre material priorly has been inserted, and where a vacuum is generated in the mould cavity hereby drawing in the polymer. The polymer can be thermoset plastic or thermoplastics.

Vacuum infusion or VARTM is a process used for moulding fibre composite mouldings, where uniformly distributed fibres are layered in a first mould part, the fibres being rovings, i.e. bundles of fibre bands, bands of rovings or mats, which are either felt mats made of individual fibres or woven mats made of fibre rovings. A second mould part, which is often made of a resilient vacuum bag, is subsequently placed on top of the fibre material. By generating a vacuum, typically 80 to 95% of the total vacuum, in the mould cavity between the inner side of the first mould part and the vacuum bag, the liquid polymer can be drawn in and fill the mould cavity with the fibre material contained herein. So-called distribution layers or distribution tubes, also called inlet channels, are used between the vacuum bag and the fibre material in order to obtain as sound and efficient a distribution of polymer as possible. In most cases the polymer applied is polyester, vinyl ester or epoxy, and the fibre reinforcement is most often based on glass fibres or carbon fibres, but may also be plastic fibres, plant fibres or metal fibres.

During the process of filling the mould, a vacuum, said vacuum in this connection being understood as an underpressure or negative pressure, is generated via vacuum outlets in the mould cavity, whereby liquid polymer is drawn into the mould cavity via the inlet channels in order to fill said mould cavity. From the inlet channels the polymer disperses in all directions in the mould cavity due to the negative pressure as a flow front moves towards the vacuum channels. Thus it is important to position the inlet channels and vacuum channels optimally in order to obtain a complete filling of the mould cavity. Ensuring a complete distribution of the polymer in the entire mould cavity is, however, often difficult, and accordingly this often results in so-called dry spots, i.e. areas with fibre material not being sufficiently impregnated with resin. Thus dry spots are areas where the fibre material is not impregnated, and where there can be air pockets, which are difficult or impossible to remove by controlling the vacuum pressure and possibly an overpressure at the inlet side. In connection with vacuum infusion, employing a rigid mould part and a resilient mould part in the form of a vacuum bag, the dry spots can be repaired after the process of filling the mould by for example puncturing the bag in the respective location and by drawing out air for example by means of a syringe needle. Liquid polymer can optionally be injected in the respective location, and this can for example be done by means of a syringe needle as well. This is a time-consuming and tiresome process. In the case of large mould parts, staff have to stand on the vacuum bag. This is not desirable, especially not when the polymer has not hardened, as it can result in deformations in the inserted fibre material and thus in a local weakening of the structure, which can cause for instance buckling effects.

Furthermore, leaks in the sealing between the first mould part and the vacuum bag and/or in the vacuum bag itself may lead to problems with effectively evacuating the mould cavity or effectively filling the mould cavity with resin, thereby also being a cause to the aforementioned dry spots. Even very small holes can cause these problems, and as fibre composite structures, such as wind turbine blades, today may have a length of more than 60 meters and have a surface area of several hundreds square meters, it can be very time consuming to find the leaks, thereby prolonging the overall production time of the laminate structure.

US 2007/057413 describes a resin infusion apparatus and system. The system uses a sealed outer cover interior, and leaks are measured by holding a vacuum in the interior and observing if a pressure drop occurs over an observation time of 4 to 6 minutes. Thus, the leaks are observed after having evacuated the interior.

U.S. Pat. No. 3,818,752 describes a complex system for detecting a leak in an enclosed chamber. The leak is detected by applying a subpressure to the enclosed chamber and a reference chamber in order to bring the two chambers into pressure equilibrium. A flow restricting valve is connected between the two chambers, and a flow sensor is connected in parallel across the flow restricting valve. A flow measured by the flow sensor is indicative of a leak in the enclosed chamber.

None of the prior art systems are applicable for detecting a leak during an evacuation process of a VARTM process.

It is an object of the invention to obtain a new method and apparatus, and which overcome or ameliorate at least one of the disadvantages of the prior art or which provide a useful alternative.

This is according to the invention achieved by a method of the aforementioned art, wherein an airflow level through the at least one vacuum outlet is measured during the evacuation process of step f). Thereby, an air leak can be detected by measuring the amount of air flow. Preferably, suction (i.e. vacuum) is supplied to the vacuum outlets during step g) also, at least until flow fronts of resin arrive at said vacuum outlets.

According to a first embodiment of the invention, the second mould part is a vacuum bag. However, the second mould part can also be another flexible material, which is suitable for sealing against the rigid mould part.

According to a preferred embodiment, a pressure level is further measured during step f). Thereby, an air leak can be determined based on both the airflow through the vacuum outlet and the vacuum level of the mould cavity.

According to an advantageous embodiment, step g) is commenced once the pressure level falls below a vacuum threshold value and the airflow level falls below an airflow threshold level. Thereby, it is ensured that the pressure level is appropriate for the filling process and that no air leaks exist, thus ensuring the optimum conditions for the resin filling process.

According to another advantageous embodiment, the mould cavity comprises a number of individual mould cavity sections, each being provided with a separate vacuum outlet, and wherein the airflow level through each vacuum outlet is measured. Thereby, the location of an air leak can be identified to one of the separate mould cavity sections, e.g. if the airflow level of the given mould cavity section exceeds a given threshold level.

According to one embodiment of the invention, each separate mould cavity section covers between 10 and 100 square meters of a first surface area of the composite structure, alternatively between 15 and 75 square meters, or alternatively between 20 and 50 square meters. That is, the surface of the finished composite structure, which faces the rigid mould part should lie within one of those intervals.

According to another embodiment of the invention, the forming structure has a longitudinal direction and a transverse direction with a first and a second side. Thus, the mould cavity can be divided into separate mould cavity sections in the longitudinal direction and/or the transverse direction by providing a number of vacuum outlets along the first side and/or the second side of the forming structure. Preferably, these vacuum outlets are distributed substantially evenly along the forming structure. The vacuum outlets may also be provided at end parts of the forming structure.

The purpose of the invention is also achieved by an apparatus of the aforementioned kind, wherein the apparatus further comprises a flow sensor for measuring an airflow arranged so as to be able to measure the airflow through the interior of the sealed container, which is also called a vessel. Thus, the purpose of the invention is also obtained by such an apparatus, which can be utilised in the aforementioned methods. The sealed container or vessel is used as an overflow container for collecting excess resin from the filling process.

According to an advantageous embodiment of the apparatus, the flow sensor is connected to the first inlet. However, the flow sensor can also be connected to the first outlet.

According to another advantageous embodiment, the apparatus further comprises a pressure transducer for measuring a pressure level. Thereby, the vacuum level of the corresponding mould cavity section can be measured simultaneously.

According to yet another advantageous embodiment, the apparatus further comprises a resin level sensor for measuring the resin level in the sealed container. Thereby, it is possible to measure the quantity of spilled or collected resin during the VARTM process, thus being able to control the quantity or weight of resin in the finished composite structure.

In one embodiment of the apparatus according to the invention, the container comprises a container part with an opening and a detachable lid sealed to the opening. The lid can for instance be sealed to the container part via a sealing ring and a fastening clamp. Thus, the lid can be removed from the container, and the resin, which has been collected in the container part can subsequently be poured out for disposal.

According to an advantageous embodiment, the first inlet and/or the first outlet and/or the pressure transducer is connected to the container through the lid. Thereby, all the sensors, inlets, and outlets can together be removed from the container part, thereby making it easier to empty the resin from the container part.

The apparatus may also contain an additional inlet, thereby being able to be connected to additional vacuum outlets during the VARTM process. The apparatus may also contain additional outlets. Furthermore, a single vacuum source, such as a compressor or vacuum pump, may be connected to more than one apparatus.

The purpose of the invention is also achieved via a use of the aforementioned apparatus for a vacuum assisted resin transfer moulding process. Furthermore, the purpose is achieved by a system for vacuum assisted resin transfer moulding comprising a rigid mould part, a flexible mould part for sealing against the rigid mould part, and a number of the aforementioned apparatuses.

Figure 2:
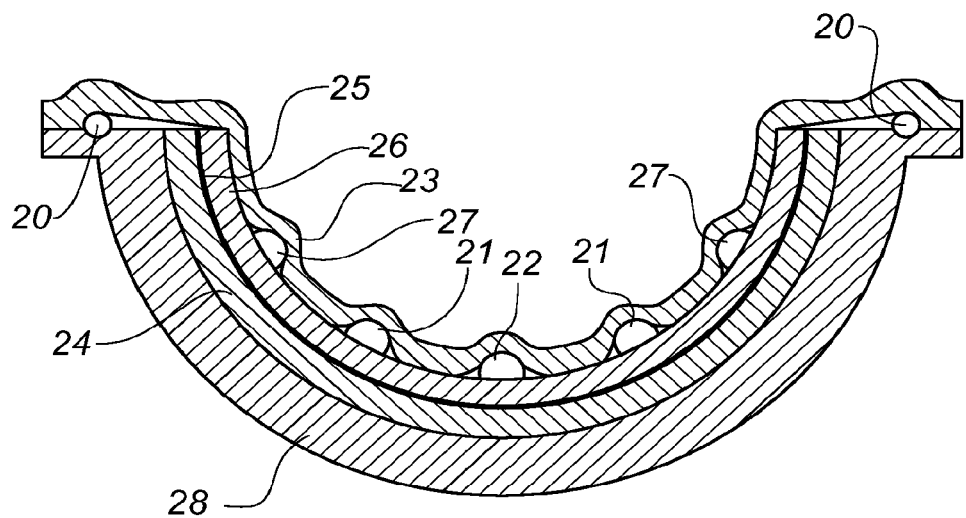
Figure 3:
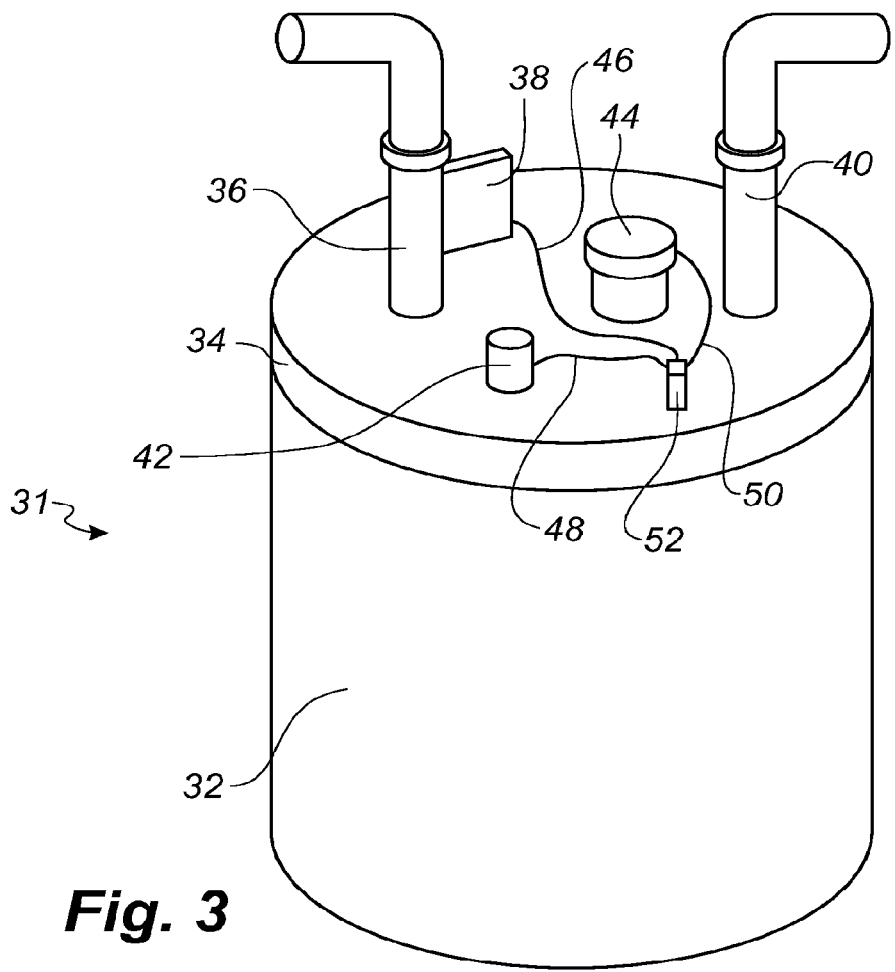
Figure 4:
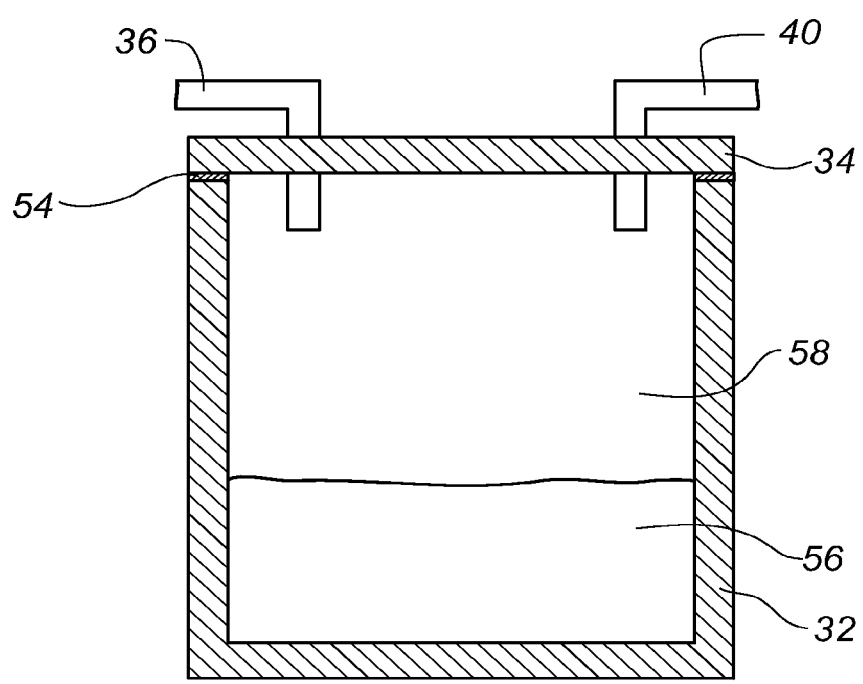

The invention is explained in detail below with reference to an embodiment shown in the drawings, in which FIG. 1 shows a mould for manufacturing a wind turbine blade shell part, FIG. 2 shows a sectional view through a mould for the manufacturing of a blade shell part, FIG. 3 shows a sealed container according to the invention for use in a VARTM process, and FIG. 4 shows a sectional view through the sealed container according to the invention.

FIG. 1 shows a solid mould part 1 seen from above. The mould part 1 has a moulding surface, which is the negative of the outer surface of a blade shell part 2. The blade shell part 2 has a leading edge 3 and a trailing edge 4. The mould part 1 comprises a first side rim 5 and a second side rim 6. The blade shell half 2 is manufactured via a VARTM process, where a fibre insertion or another fibre material is arranged in a mould cavity. The mould cavity is evacuated via a number of apparatuses 30 according to the invention, each comprising a first inlet 14, a first outlet 16, a sealed contained 31, and a vacuum source 18. By distributing the apparatuses 30 evenly around the mould cavity, each apparatus effectively evacuates a separate part of the entire mould cavity. Consequently, the mould cavity is divided into a number of separate mould cavity parts 8-13, which can be monitored individually.

FIG. 2 shows a sectional view through a mould for the production of a blade shell part for a blade of a wind turbine by vacuum infusion and shows a solid or rigid mould part 1 with a top side mating to the exterior top side of the completed blade shell half. A fibre insertion 24 of for example glass fibre or carbon fibre is placed on the inner top side of the solid mould part 1. This layer can also be a sandwich structure comprising a core material, such as foamed polymer or balsa wood, covered by fibre layers, and can also comprise a longitudinally extending reinforcement section called a main laminate as described in for instance WO 06/058540 by the present applicant.

On top of the fibre insertion 24, a tear-off layer 25 or peel ply is placed which can be a net or a perforated film, and on top of the tear-off layer 25 a distribution net or a flow layer 26 is placed. On top of the distribution net/flow layer 26 a plurality of Ω-shaped inlet profile bodies 21, 22, 27 are placed, said bodies including a longitudinal slot facing the distribution net 26. On top hereof an air-tight vacuum bag 23 is placed. At the flanges of the mould, vacuum channels are provided in the form of perforated vacuum tubes 20.

The vacuum tubes 20 communicate with an apparatus 30 according to the invention, and the inlet profile bodies 21, 22, 27 communicate with a polymer source with liquid polymer. The vacuum in the vacuum channels 20 generate a vacuum in a mould cavity formed between the solid mould part 1 and the vacuum bag 23, and thus polymer is drawn or sucked through the inlet profile bodies 21, 22, 27 downwards into the distribution net 26 and along said distribution net 26 through the tear-off layer 25, as it spreads and impregnates the fibre insertion 24. Upon the completion of curing, the vacuum bag 23, the inlet profile bodies and the distribution net 26 are removed by means of the tear-off layer 25.

FIG. 3 shows a schematic view of part of the apparatus 30 according to the invention, seen in perspective. The apparatus 30 comprises a sealed container 31, which in turn comprises a container part 32 and a lid 34, which is sealed to the container part 32. FIG. 4 shows a cross section of the sealed container 31, where—for the sake of clarity—some of the parts shown in FIG. 3 have been removed. The lid 34 may for instance be sealed to the container part 32 via a sealing ring 54 and a fastening clamp.

A first inlet tube 36 is connected through the lid 34 so that the inlet tube 36 can communicate with an interior 58 of the sealed container 31. Furthermore, a first outlet tube 40 is connected through the lid 34 so that the outlet tube 40 can communicate with the interior 58 of the sealed container 31. The inlet tube 36 is connected to the mould cavity and the outlet tube 40 is connected to a vacuum source or compressor 18. A gas mass flow sensor 38 is connected to the inlet tube 36 in order to measure the gas flow through the interior 58 of the container 31. Furthermore, a pressure transducer 42, such as a diaphragm pressure transducer, is connected through the lid 34. Thereby, it is possible to monitor the vacuum level as well, i.e. the pressure in the interior 58 of the sealed container 31 and consequently the vacuum level of the mould cavity or the individual mould cavity sections 8-13.

If it is determined that the gas flow for a given apparatus exceeds a predetermined threshold value (for a given vacuum level), then the operator knows that a leak exists in the mould cavity. If only a single apparatus identifies such a leak, it can be concluded that the leak exists in the corresponding mould cavity section 8-13. If more than one apparatus identifies a leak, it is determined that the leak probably is located around the borders between the corresponding mould cavity section 8-13. By using flow sensors, an operator the VARTM process can identify leaks and the location of such leaks much faster than other systems known in the art. Furthermore, such leaks most often occur at the sealing between the rigid mould part 1 and the vacuum bag 23, i.e. near the leading edge 3 or the trailing edge 4 of the blade shell part 2 or near the first side rim 5 or the second side rim 6 of the mould part 1. Such knowledge also speeds up the process of identifying such leaks.

Furthermore, the lid 34 may comprise a level transducer for measuring the level of resin 56 and thereby the volume of the resin inside the container part 32. Thereby, the operator can easily calculate the quantity or weight of the resin impregnating the composite structure by subtracting the amount or resin in the interior 58 of the sealed containers 31 from the amount of resin supplied to the mould cavity. Thereby, it is easier to control the weight of the finished composite structure and to determine when to stop the filling process before curing the composite structure.

The flow sensor 38, the pressure transducer 42 and the level transducer 44 are connected via wires 46, 48, 50 to a connecter 52, which for instance can be connected to a computer for monitoring the gas flow, the vacuum level, and the amount of resin spilled in to the sealed container 31, respectively. The sensors or transducers can for instance be 4-20 mA circuits.

The invention has been described with reference to a preferred embodiment. However, the scope of the invention is not limited to the illustrated embodiment, and alterations and modifications can be carried out without deviating from the scope of the invention.

LIST OF REFERENCE NUMERALS 1 mould part
2 wind turbine blade shell part
3 leading edge
4 trailing edge
5 first rim
6 second rim
8-13 mould cavity parts
14 first inlet
16 first outlet
18 vacuum source/compressor
20 vacuum channels
21 resin inlet channels/vacuum channels
22 resin inlet channel/vacuum channel
23 vacuum bag
24 fibre material
25 tear-off layer/peel ply
26 distribution net
27 resin inlet channels/vacuum channels
28 solid mould part
30 apparatus
31 sealed container
32 container part
34 lid
36 inlet tube
38 mass flow sensor
40 outlet tube
42 pressure transducer
44 resin level sensor/transducer
46, 48, 50 wire
52 output/connector
54 sealing ring

The invention claimed is:

1. A method for manufacturing a composite structure comprising fibre reinforced material by means of vacuum assisted resin transfer moulding, where fibre material is impregnated with liquid resin, the method comprising the steps of:
    a) providing a forming structure comprising a rigid mould part and a second mould part,
    b) placing the fibre material in the rigid mould part,
    c) sealing the second mould part against the rigid mould part to form a mould cavity, d) connecting a source of uncured fluid resin to at least one resin inlet communicating with the mould cavity, e) connecting at least one vacuum outlet communicating with the mould cavity, f) evacuating the interior of the forming structure through the at least one vacuum outlet, characterized in that an airflow level through the at least one vacuum outlet is measured during the evacuation process, and the steps:

g) supplying resin from the source of uncured resin to the mould cavity through the at least one resin inlet so as to fill the mould cavity with said resin, h) curing the resin in order to form the composite structure, wherein a pressure level is measured during step f); and wherein step g) is commenced once the pressure level falls below a vacuum threshold value and the airflow level falls below an airflow threshold level.

2. A method for producing a composite structure according to claim 1, wherein the second mould part is a vacuum bag.

3. A method for producing a composite structure according to claim 1, wherein the mould cavity comprises a number of individual mould cavity sections, each being provided with a separate vacuum outlet, and wherein the airflow level through each separate vacuumed outlet is measured.

4. A method according to claim 3, wherein each separate mould cavity section covers between 10 and 100 square meters of a first surface area of the composite structure, alternatively between 15 and 75 square meters, or alternatively between 20 and 50 square meters.

5. A method for manufacturing a composite structure comprising fibre reinforced material by means of vacuum assisted resin transfer moulding, where fibre material is impregnated with liquid resin, the method comprising the steps of:

a) providing a forming structure comprising a rigid mould part and a second mould part, b) after providing the forming structure, placing the fibre material in the rigid mould part, c) after placing the fibre material, sealing the second mould part against the rigid mould part to form a mould cavity, d) after sealing the second mould part, connecting a source of uncured fluid resin to at least one resin inlet communicating with the mould cavity, e) after connecting the source of uncured fluid resin, connecting at least one vacuum outlet communicating with the mould cavity, f) after connecting at least one vacuum outlet, evacuating the interior of the forming structure through the at least one vacuum outlet, characterized in that an airflow level through the at least one vacuum outlet is measured during the evacuation process, g) after evacuating the interior of the forming structure, supplying resin from the source of uncured resin to the mould cavity through the at least one resin inlet so as to fill the mould cavity with said resin, h) after supplying uncured resin, curing the resin in order to form the composite structure wherein a pressure level is measured during step f); and wherein step g) is commenced once the pressure level falls below a vacuum threshold value and the airflow level falls below an airflow threshold level.

6. The method according to claim 1, wherein step f) further comprises testing for an air leak by comparing the pressure level with the measured airflow level through the at least one vacuum outlet and the vacuum level of the mould cavity.

* * * * *